United States Patent
Nguyen et al.

(10) Patent No.: US 9,401,041 B2
(45) Date of Patent: Jul. 26, 2016

(54) MULTI VIEW SYNTHESIS METHOD AND DISPLAY DEVICES WITH SPATIAL AND INTER-VIEW CONSISTENCY

(71) Applicants: Truong Q. Nguyen, San Diego, CA (US); Lam Tran, San Diego, CA (US); Can Bal, La Jolla, CA (US); Ramsin Khoshabeh, San Diego, CA (US)

(72) Inventors: Truong Q. Nguyen, San Diego, CA (US); Lam Tran, San Diego, CA (US); Can Bal, La Jolla, CA (US); Ramsin Khoshabeh, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 177 days.

(21) Appl. No.: 14/353,420

(22) PCT Filed: Oct. 23, 2012

(86) PCT No.: PCT/US2012/061440
§ 371 (c)(1),
(2) Date: Apr. 22, 2014

(87) PCT Pub. No.: WO2013/062944
PCT Pub. Date: May 2, 2013

(65) Prior Publication Data
US 2014/0293028 A1    Oct. 2, 2014

Related U.S. Application Data (60) Provisional application No. 61/551,744, filed on Oct. 26, 2011.

(51) Int. Cl.
*G06T 15/08* (2011.01)
*H04N 13/00* (2006.01)
*H04N 13/04* (2006.01)

(52) U.S. Cl.
CPC ............ *G06T 15/08* (2013.01); *H04N 13/0011* (2013.01); *H04N 13/0022* (2013.01); *H04N 13/0404* (2013.01); *H04N 2013/0081* (2013.01)

(58) Field of Classification Search
CPC ............... G06T 15/08; H04N 13/0022; H04N 2013/0081
See application file for complete search history.

(56) References Cited

U.S. PATENT DOCUMENTS

2002/0061131 A1   5/2002   Sawhney et al.
2009/0003728 A1   1/2009   Ernst et al.
(Continued)

FOREIGN PATENT DOCUMENTS

EP          2 369 850          9/2011

OTHER PUBLICATIONS

Cheng, C.M., et al., "Spatio-Temporally Consistent Multi-view Video Synthesis for Autostereoscopic Displays," *Pacific Rim Conference on Multimedia (PCM)*, (2010), pp. 532-542.

(Continued)

*Primary Examiner* — Joseph Ustaris
*Assistant Examiner* — Zhubing Ren
(74) *Attorney, Agent, or Firm* — Greer, Burns & Crain, Ltd.

(57) ABSTRACT

An embodiment of the invention is a method that provides common data and enforces multiple view consistency. In a preferred embodiment, a coordinate alignment matrix is generated after initial warped views are formed. The matrix is used efficiently to repair holes/occlusions when synthesizing final views. In another preferred embodiment, a common background layer is generated based upon initial warped views. Holes are repaired on the common background layer, which can then be used for synthesizing final views. The cost of the latter method is sub-linear, meaning that additional views can be generated with lesser cost. Preferred methods of the invention also use a placement matrix to generate initial warped views, which simplifies warping to a lookup operation.

5 Claims, 6 Drawing Sheets

(56) References Cited

U.S. PATENT DOCUMENTS

| 2009/0015662 | A1* | 1/2009 | Kim | H04N 19/593 |
| | | | | 348/43 |
| 2009/0129667 | A1 | 5/2009 | Ho et al. | |
| 2010/0103249 | A1* | 4/2010 | Lipton | H04N 13/0022 |
| | | | | 348/51 |
| 2010/0238160 | A1 | 9/2010 | Yea et al. | |

OTHER PUBLICATIONS

Rogmans, S., et al., "Real-time Stereo-based View Synthesis Methods: A Unifed Framework and Evaluation on Commodity GPUs," *Signal Processing: Image Communication*, vol. 24, (2009), pp. 49-64.

Tran, Lam et al., "View Synthesis based on Conditional Random Fields and Graph Cuts," *Proceedings of the International Conference on Image Processing* (2010).

Jain, Ankit, et al., "Efficient Stereo-To-Multiview Synthesis", *Proceeding of International Conference on Acoustics, Speech, and Signal Processing 2011*, IEEE 2011, pp. 889-892.

Mori, Yuji, et al., "View generation with 3D warping using depth information for FTV", *Signal Processing: Image Communication*, 24 (2009) pp. 65-72.

Mueller, Karsten, et al., "View Synthesis for Advanced 3D Video Systems", *EURASIP Journal on Image and Video Processing*, vol. 2008, (2008), 11 pages.

Ndjiki-Nya, P., et al., "Depth Image Based Rendering with Advanced Texture Synthesis", *IEEE International Conference on Multimedia and Expo*, (2010), pp. 424-449.

Tran, Lam, et al., "Spatially Consistent View Synthesis with Coordinate Alighment", *Proceedings of International Conference of Acoustics, Speech and Signal Processing 2011*, (2011) pp. 905-908.

Zinger, S., et al., "Free-viewpoint depth image based rendering", *Journal Visual Communication and Image Representation*, vol. 21, (2010) pp. 533-541.

Zitnick, C. Lawrence, et al., "High-quality video view interpolation using a layered representation", *ACM Transactions on Graphics (Proc. SIGGRAPH 2004)*, 23(3), Aug. 2004, 9 pages.

\* cited by examiner

MULTI VIEW SYNTHESIS METHOD AND DISPLAY DEVICES WITH SPATIAL AND INTER-VIEW CONSISTENCY

PRIORITY CLAIM AND REFERENCE TO RELATED APPLICATION

The application claims priority under 35 U.S.C. §119 from prior provisional application Ser. No. 61/551,744, which was filed on Oct. 26, 2011.

FIELD

A field of the invention is video processing systems and devices. The invention particularly concerns methods, systems and devices for rendering of multiple views from a stereoscopic (2 or 3 camera) video data stream.

BACKGROUND

Current mainstream 3D displays use polarization technology to separate the views each eye sees and thus require glasses for the 3D perception. Manufacturers and users of 3D display technology would prefer to eliminate the need for users to wear glasses. The glasses are inconvenient and sometimes uncomfortable, which tends to limit acceptance of 3D displays by many consumers. Also, the need for special purpose glasses generally limits viewing opportunities to special locations, typically movie theatres and home theatre systems. Displays in other environments would also benefit from 3-D displays. The inconveniences and limitations associated with displays requiring special-purpose glasses have lead to the development of autostereoscopic displays. Autostereoscopic displays obviate the need for glasses and likely represent the next generation of 3D mainstream displays.

Autostereoscopic displays typically include a regular LCD screen with a "lenticular sheet", which distributes the light emitted from different pixels in different directions. A practical display should work well even when a viewer is not in a single particular location relative to the display. Practical uses should support multiple viewers having different relative locations and angular positions with respect to the display screen.

Accordingly, these displays should accommodate multiple points-of-view, typically 5, 8, 9 or more. This presents significant challenges in making autostereoscopic displays. A principle challenge involves generating or obtaining significant display data content to support display of multiple viewpoints of the same scene at the same time.

One type of solution involves complex data acquisition, specifically multiple cameras capturing each separate viewpoint to be supported. However, the video streams must be synchronized and this can involve the complex use of a synchronized camera rig with one camera for each viewpoint. Supporting 5 or more viewpoints quickly becomes expensive, difficult and unreliable. Widespread adoption of this approach is unlikely as it is costly to build and maintain, impractical to calibrate, synchronize and operate, and usually immobile.

For this reason, a more common approach is to capture the content with significantly fewer cameras (typically 2 or 3) and generate the other views as if they were shot with virtual cameras. Existing methods usually generate the desired virtual views on their own, and this can result in inconsistencies between the generated views. There are also methods that address this issue; however their approaches are rather explicit, which makes them suffer from long execution times.

Existing methods range between very fast but simplistic to very advanced but slow. A class of prior methods uses a circular camera setup where almost all of the occluded areas in one of the captured views appear in another. This type of camera setup allows a layered approach where a background layer can be extracted from the given stereo images and used to fill in missing regions. See, C. L. Zitnick, S. B. Kang, M. Uyttendaele, S. Winder, and R. Szeliski, "High-Quality Video View Interpolation Using a Layered Representation," Proc. ACM SIGGRAPH (August 2004); K. Muller, A. Smolic, and K. Dix, "View Synthesis for Advanced 3D Video Systems," EURASIP Journal on Image and Video Processing (2008). This approach is especially useful when the virtual cameras are to be positioned arbitrarily in 3D space, as in the case of free viewpoint TV (FTV). With this type of approach, in the case of autostereoscopic screens, the virtual cameras need to be positioned along a line or a wide arc. As a result, the circular camera class of methods introduces unnecessary complexity both to depth estimation and view synthesis.

For rectified camera setups, there are view synthesis methods that process the missing regions pixel-by-pixel and also methods which use patch based in-painting. The pixel based methods tend to use interpolation or simple in-painting methods but they usually suffer from blur in the synthesized region. See, e.g., S. Zinger and L. Do, "Free-Viewpoint Depth Image Based rendering," Journal Visual Communication and Image Representation, vol. 21, pp. 533-541 (2010); Y. Mori, N. Fukushima, T. Yendo, T. Fujii, and M. Tanimoto, "View Generation with 3D Warping Using Depth Information for FTV," IEEE Journal Signal Proc.: Image Communication, pp. 65-72, (2009). Some of the pixel based methods fill in the missing regions using more advanced methods and optimization techniques. A. Jain, L. Tran, R. Khoshabeh, and T. Nguyen, "Efficient Stereo-to-Multiview Synthesis," Proceedings of International Conference on Acoustics, Speech, and Signal Processing (2011); L. Tran, C. J. Pal, and T. Q. Nguyen, "View Synthesis based on Conditional Random Fields and Graph Cuts," Proceedings of the International Conference on Image Processing (2010). The more advanced methods yield better results, but patch-based methods are still usually superior. For example patch-based methods, see L. Tran, R. Khoshabeh, A. Jain, C. Pal, and T. Nguyen, "Spatially Consistent View Synthesis with Coordinate Alignment," Proceedings of International Conference on Acoustics, Speech and Signal Processing (2011); P. Ndjiki-Nya, M. Koppel, D. Doshkov, H. Lakshman, P Merkle, K. Muller, and T. Wiegand, "Depth Image Based Rendering with Advanced Texture Synthesis," IEEE International Conference on Multimedia and Expo, pp. 424-429 (2010). Tran et al. seeks to achieve inter-view consistency in a patch-based method and other patch-based methods seek to achieve temporal consistency. C. M. Cheng, X. A. Hsu, and S. H. Lai, "Spatio-Temporally Consistent Multi-view Video Synthesis for Autostereoscopic Displays," Pacific Rim Conference on Multimedia (PCM), pp. 532-542 (2010).

There are also methods which seek to leverage the processing power of modern GPUs to speed-up the parallelizable processes. S. Rogmans, J. Lu, P. Bekaert, and G. Lafruit, "Real-time Stereo-based View Synthesis Methods: A Unifed Framework and Evaluation on Commodity GPUs," Signal Processing: Image Communication, vol. 24, pp. 49-64 (2009); S. Rogmans, J. Lu, P. Bekaert, and G. Lafruit, "Real-time Stereo-based View Synthesis Methods: A Unifed Framework and Evaluation on Commodity GPUs," Signal Processing: Image Communication, vol. 24, pp. 49-64, 2009. Although these methods can achieve very fast view synthesis, they are effective primarily with very simple approaches.

SUMMARY OF THE INVENTION

An embodiment of the invention is a method that provides common data and enforces multiple view consistency. In a preferred embodiment, a coordinate alignment matrix is generated after initial warped views are formed. The matrix is used efficiently to repair holes/occlusions when synthesizing final views. In another preferred embodiment, a common background layer is generated based upon initial warped views. Holes are repaired on the common background layer, which can then be used for synthesizing final views. The cost of the latter method is sub-linear, meaning that additional views can be generated with lesser cost. Preferred methods of the invention also use a placement matrix to generate initial warped views, which simplifies warping to a look-up operation.

DETAILED DESCRIPTION OF THE PREFERRED EMBODIMENTS

Multi view synthesis methods, systems and display devices of the invention provide spatial and inter-view consistency with computationally inexpensive tools. Preferred embodiments can deliver visually pleasing results with equivalent or less computation than typical past view-synthesis techniques. The invention allows for the re-construction of a 3-D autostereoscopic display with fairly complete viewpoint coverage from a limited camera array. Typical past methods require either an elaborate camera array of five or more expensive cameras, or a very computationally intensive process. Methods of the invention can efficiently generate any number of virtual views along the baseline of a rectified stereo pair of images (assuming their disparity information is known or estimated), and ensures that all of the generated views are consistent with each other.

In a preferred embodiment, identical occluded regions are found within each virtual view. The occlusion regions are aligned together to extract a surrounding local background layer. The local background layer for each occluded region is then used with an exemplar based inpainting to synthesize all virtual views simultaneously. The exemplar based inpainting ensures realistic looking texture for the synthesized data.

In preferred embodiments, coordinate alignment is used to align occlusions. Holes are then handled individually with information from a local background layer that is extracted. In the coordinate alignment, an initial pixel warping onto virtual views creates holes/occlusions. The coordinate alignment substantially aligns holes in the warped views. Background data is extracted from the original image data to repair holes independently. In other embodiments, which are less computationally expensive, holes from different views are mapped onto a common background layer. The holes are repaired on the common background layer using original image data and the common background layer is used in final synthesis.

Preferred methods perform a disparity refinement step to alleviate errors in initial warping due to poor disparity estimation. A preferred approach to fix this problem is to use color segmentation to group pixels of each reference image into small segments where each segment represents a planar surface in the 3D world.

Preferred embodiments of the invention will now be discussed with respect to the drawings. The drawings may include schematic representations, which will be understood by artisans in view of the general knowledge in the art and the description that follows. Features may be exaggerated in the drawings for emphasis, and features may not be to scale.

Figure 1A:
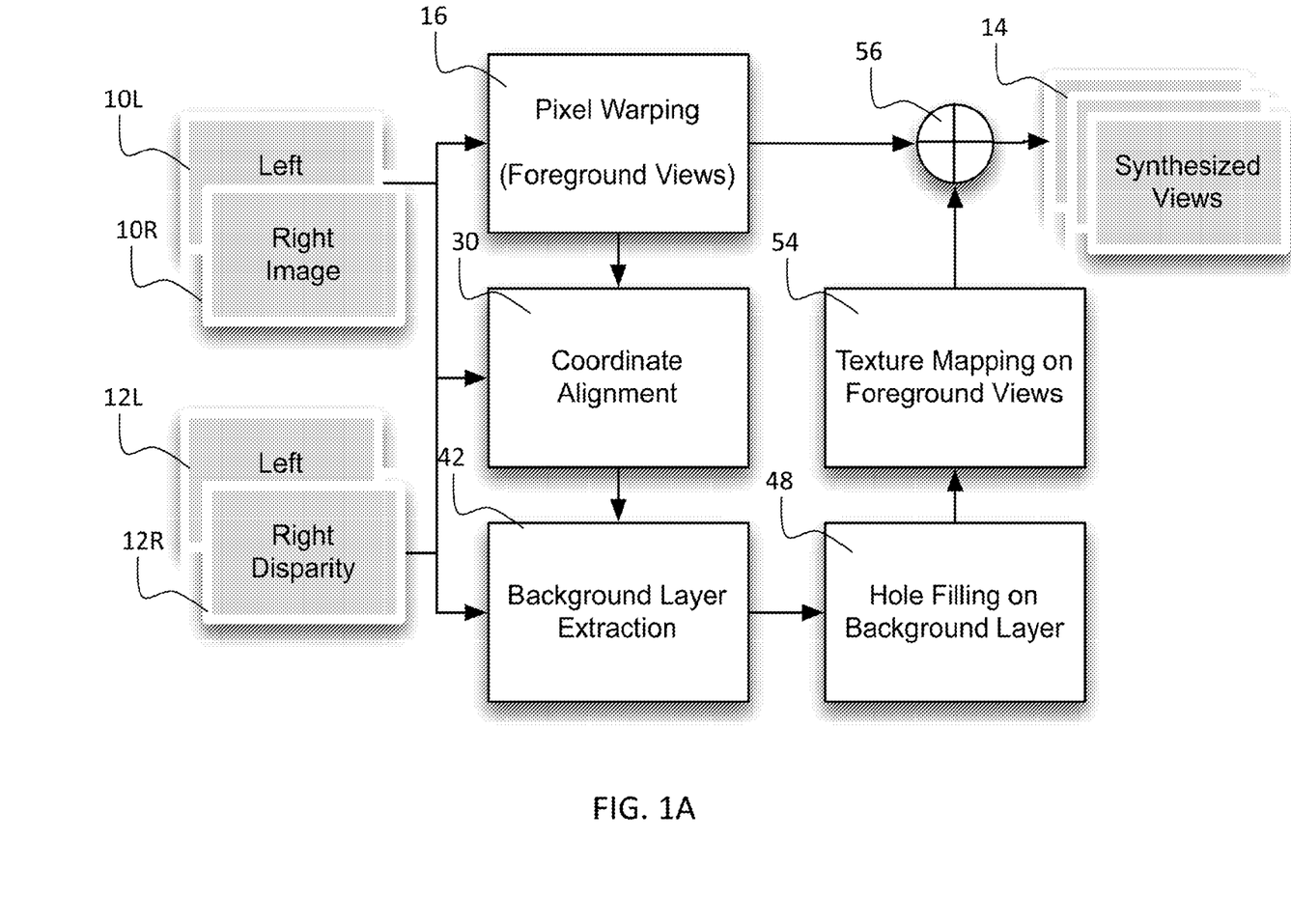
FIG. 1 is a block diagram of a view synthesis method of the invention including coordinate alignment for efficient hole-by-hole processing to resolve inter-view occlusions.
Figure 1B:
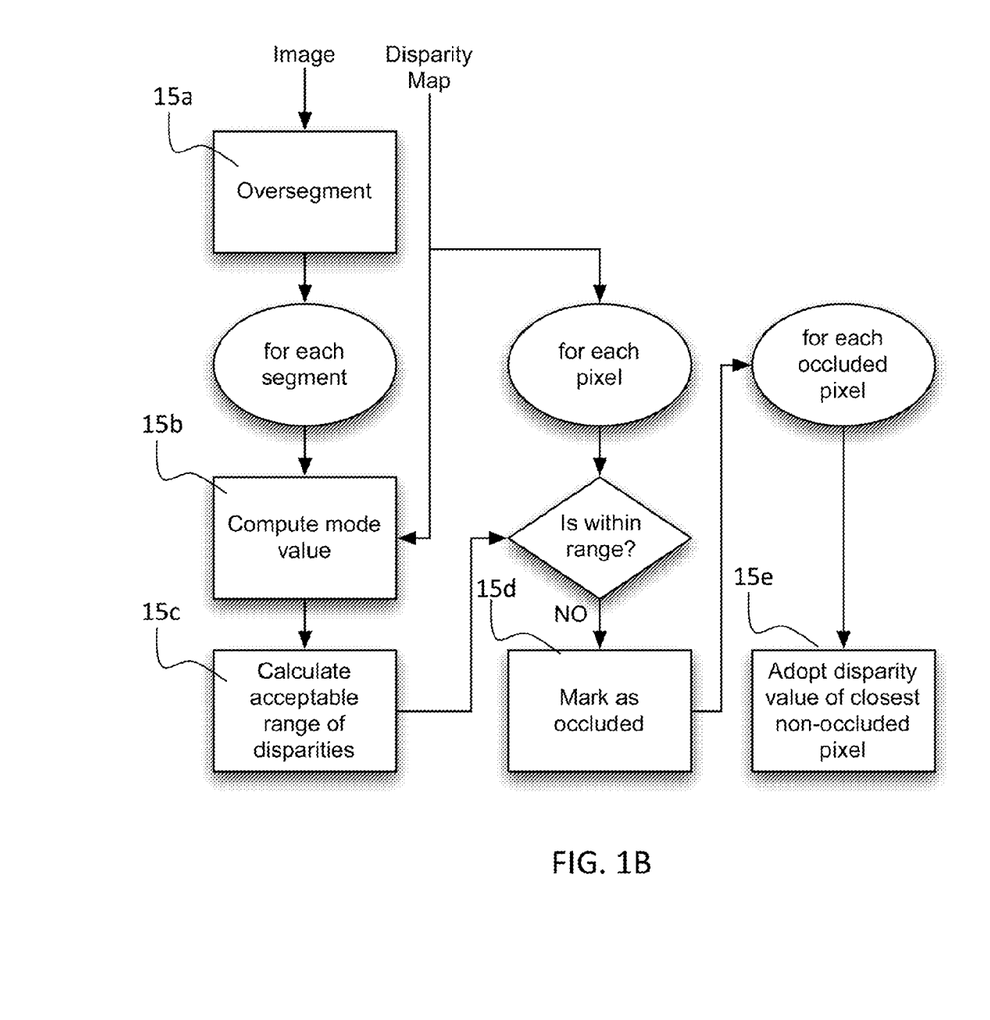
Figure 2:
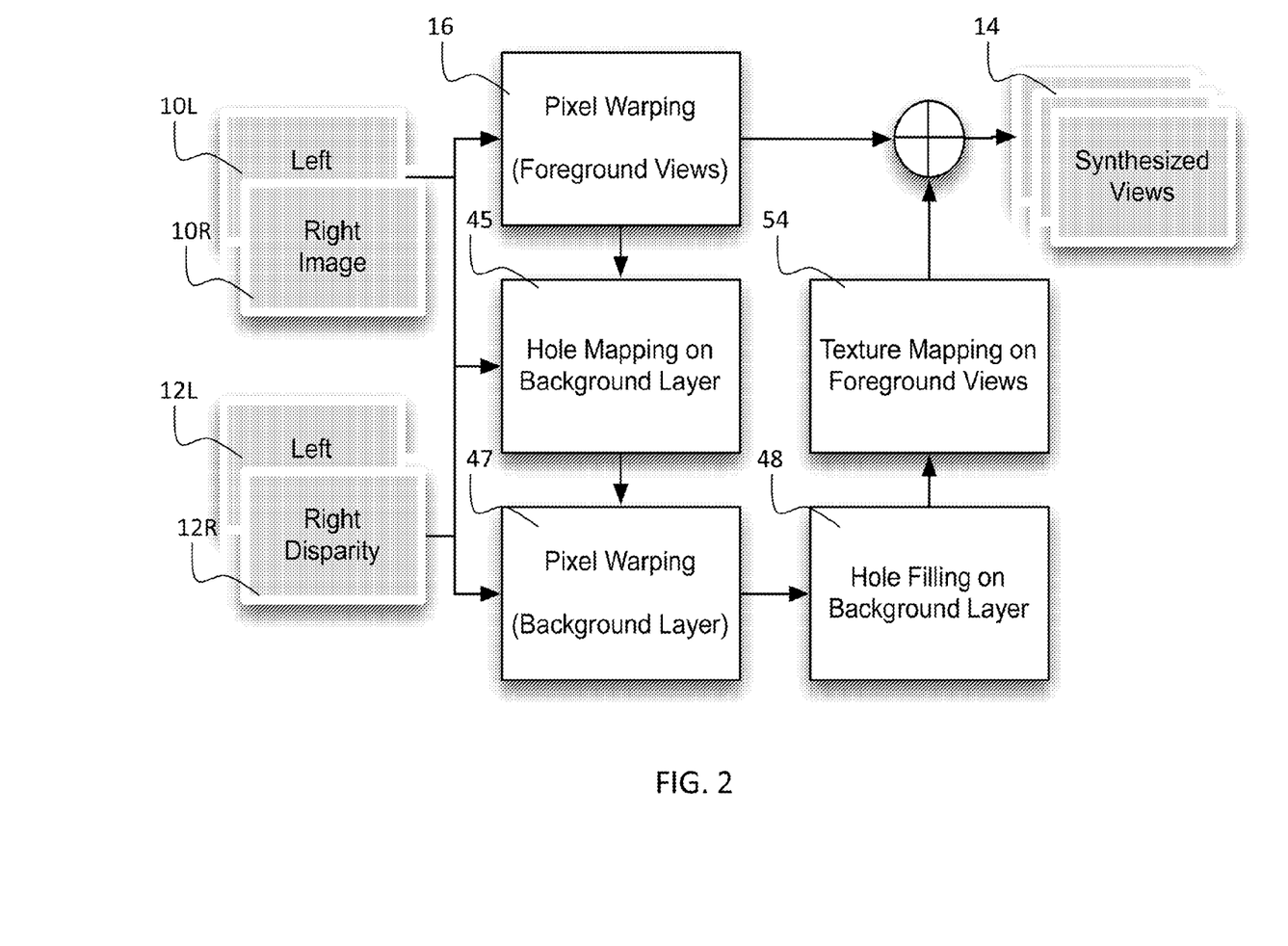
FIG. 2 is a block diagram of a view synthesis method of the invention including generation of a common background layer for simplified processing to resolve occlusions.

FIGS. 1A, 1B and 2 show a preferred method and high level architecture for view synthesis methods and synthesis devices of the invention. The input to the system includes left and right image data $10_L$, $10_R$, with associated left and right disparity data $12_L$, $12_R$. The disparity data can either be estimated from the captured views (left and right image data or additional data) or can be captured directly using setups such as time-of-flight cameras, Kinect or by structure from lighting methods. The left and right image data and their associated disparity maps are sufficient in methods of the invention to produce synthesized virtual views 14. The invention can also be used with additional image and disparity data, e.g., 3 or more captured views and associated disparity data. However, the case of having only two views is considered here to illustrate an important benefit of the invention. The number of synthesized virtual views that can be generated in either of FIGS. 1 and 2 is, in general, arbitrary. The number of views in practical cases will be balanced between computational demands and a good user experience for viewing a display based upon the synthesized views. An exemplary number of views can be, for example, typically 5, 8, 9 or more. The number of views generated is dependent upon the display. Typical current displays would utilize 8-9 views. As pixel density increases in 3D capable displays, the number of views will increase. Common procedures applied in FIGS. 1 and 2 will be discussed together.

Preferably, the disparity maps are first refined as in FIG. 1B. As the initial step, a robust mean shift color segmentation method oversegments the two reference images 15a. An example segmentation method is disclosed in D. Comaniciu, P. Meerr, "Mean shift: A robust approach toward feature space analysis," IEEE Transactions on Pattern Analysis and Machine Intelligence, 24:603-619 (2002). Pixels within the same segment are assumed to belong to the same object and their disparities cannot vary significantly. The mode of the disparity is found 15b for each segment. An acceptable range is determined 15c. An appropriate range can be selected manually, for example, or based upon scene statistics, or can be a user parameter that is controlled by display settings to achieve a pleasing result. Pixels with disparity that fall outside of a predetermined range 15c (e.g., ±20 range) from the mode are marked as occluded 15d. The occluded pixels are then filled 15e with the disparity of the nearest non-occluded neighboring pixels in the segment to generate left D, and right D, refined disparity maps.

16—Foreground View Synthesis (With Holes)

The foreground view synthesis is the same in FIG. 1A and FIG. 2. View synthesis methods rely on disparity maps to render the virtual views using the pixels known from the captured views. Given disparity maps, as the initial step, most view synthesis methods use the "Depth-image-based rendering (DIBR)" method to warp the known pixels onto the image plane of the desired view. See, C. Fehn, "Depth-Image-Based Rendering (DIBR), Compression and Transmission for a New Approach on 3D-TV," Proceedings of SPIE Stereoscopic Displays and Virtual Reality Systems XI, vol. 5291, pp. 93-104 (2004).

Instead of warping the pixels directly as in DIBR, the pixel warping 16 in FIGS. 1 and 2 starts by forming a "placement matrix". If the left and right images' positions are defined as 0 and 1, respectively, the goal is to synthesize a virtual view along the baseline of these two views, at a position α where 0<α<1.

Baseline is defined as the line that connects the point of origin of the cameras in the stereo rig. This limits the camera location to be on this line but not necessarily in-between the cameras. The restriction on α constrains the location between the cameras. This is preferred, but not required. The system can synthesize views outside of the two input views. Expectedly, the performance degrades with the distance away from the input views. It is assumed that there is no rotation between the cameras (both within the stereo cameras and between the input cameras and the virtual ones), i.e., a rectified camera rig is used. Since the example formulation is symmetric for left and right views, the reference image position will be indicated by k, where k ∈ {0,1}. In this notation, images and the associated disparity maps are denoted by $I_k$ and $D_k$ respectively. The placement matrix at position α is defined as:

$$P_k^\alpha(x, y+(k-\alpha)D_k(x,y))=y, \qquad (1)$$

where x and y are the row and column indices respectively. The placement matrix $P_k^\alpha(x',y')=\hat{y}$ provides the pixel location (x', y') in the reference image that should be mapped on the pixel location (x', y') in the virtual view after warping. Having this information, then pixel warping becomes a simple table look-up operation. Depending on the values of $D_k$, it is possible to get two or more candidate values for the same location on $P_k^\alpha$.

This happens when pixels at different disparity levels need to get warped onto the same pixel location. For foreground view generation, pixels with larger disparity (pixels closer to the camera) are preferred to be warped over the others. For such occasions where there exist two pixels with column indices $y_m$ and $y_n$, and row index x such that $y_m \neq y_n$ and $y'=y_m-\alpha D_k(x,y_m)=y_n-\alpha D_k(x,y_n)$ the warping 16 uses the following rule:

$$P_k^\alpha(x, y') = \begin{cases} y_m & \text{if } D_k(x, y_m) > D_k(x, y_n) \\ y_n & \text{otherwise} \end{cases} \qquad (2)$$

Figure 3A:
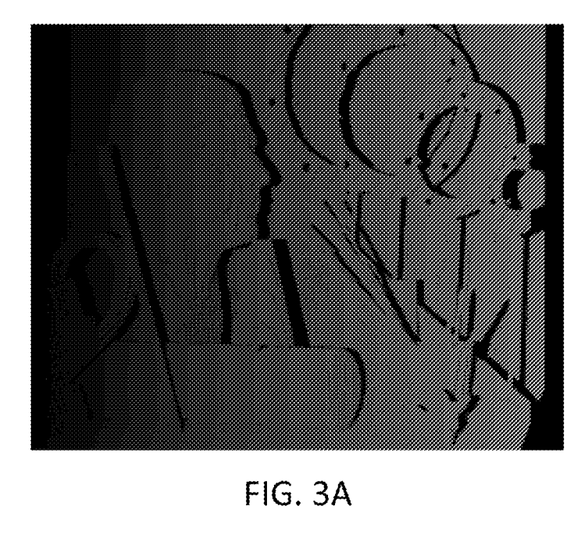
FIG. 3A illustrate cracking caused in placement matrices for example image data by quantized disparity maps and FIG. 3B the result of fixing the cracks.

However the disparity maps are usually quantized to certain discrete levels and this sometimes causes local inconsistencies on the placement matrices that appear as "cracks". FIG. 3A illustrates an example of a placement matrix, with the mentioned cracks due to quantized disparity maps. For this specific example, they are most salient on the face of the sculpture and on the rings located on the right-hand side.

Figure 3B:
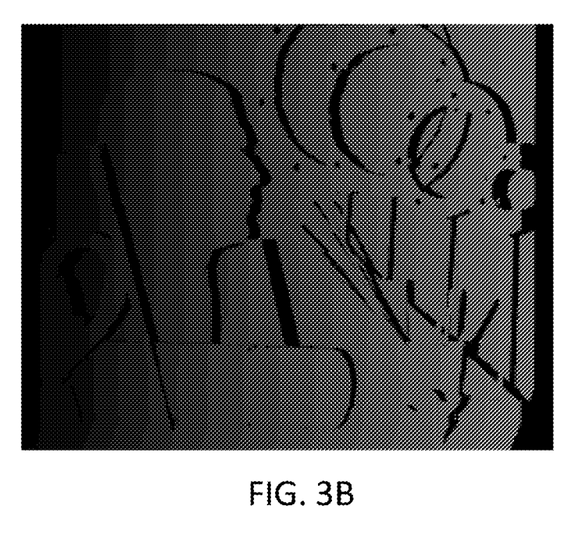
Figure 4A:
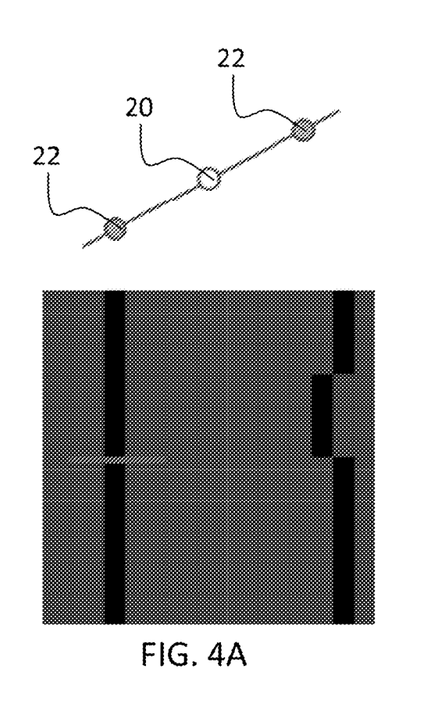
FIGS. 4A-4C illustrates 16×16 pixel sections from placement matrices and the placement matrix mappings that cause cracks.
Figure 4B:
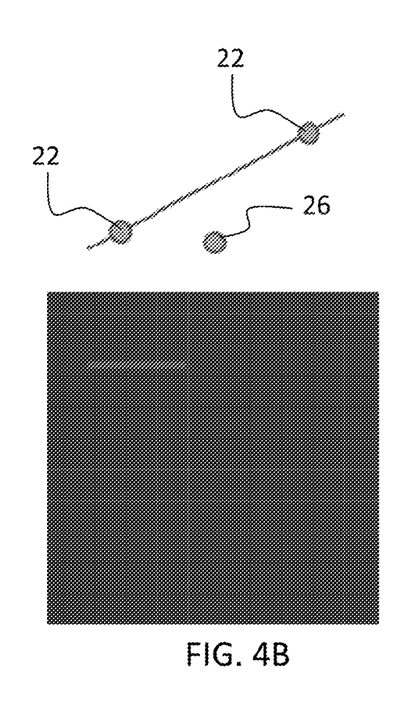
Figure 4C:
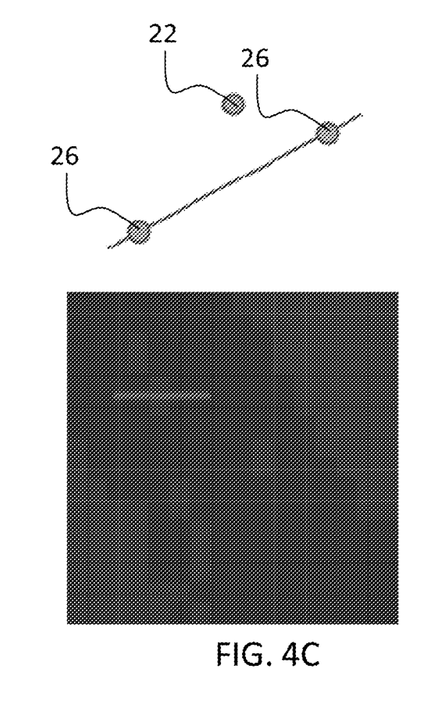

The invention recognizes that placement matrices should exhibit a non-decreasing trend from left to right, with rapid jumps around object boundaries (neglecting the unknown regions). Defects in the form of cracks contradict this nature, and are therefore easy to detect on the placement matrices. Three situations that cause cracks are illustrated in FIGS. 4A-4C. Each of FIGS. 4A-4C illustrates 16×16 pixel sections from the placement matrices. Horizontal lines on these sections indicate rows where these cracks appear. Mappings above the section indicated causes for each of the cracks. The cause in FIG. 4A is a missing value 20 in between two known foreground values 22. The second case in FIG. 4B occurs when a background object pixel value 26 fills in a crack although it should belong to a foreground object, and the last case in FIG. 4C occurs when the opposite happens with a foreground pixel value 22 filling in a crack that should belong to a background object. Once detected, this can be corrected with a simple replacement of the middle values with the average of the neighboring two pixels. FIG. 3B illustrates the corrected image.

As mentioned before, after the placement matrices are formed, then warping the pixels onto the correct positions become as simple as a table look-up operation. The warped disparity maps $D_k^\alpha$ and images $I_k^\alpha$ are calculated as follows:

$$D_k^\alpha(x,y)=D_k(x,P_k^\alpha(x,y))$$

and $$I_k^\alpha(x,y)=I_k(x,P_k^\alpha(x,y)).$$

The warping operation is performed for both left and the right views. Next, the warped disparity maps and images are blended into a single disparity map $D^\alpha$ and image $I^\alpha$. In a preferred embodiment, the operation is conducted as follows:

$$D^\alpha(x, y) = \beta^\alpha(x, y)D_0^\alpha(x, y) + (1 - \beta^\alpha(x, y))D_1^\alpha(x, y) \qquad (3)$$

and $$I^\alpha(x, y) = \beta^\alpha(x, y)I_0^\alpha(x, y) + (1 - \beta^\alpha(x, y))I_1^\alpha(x, y)$$

where $$\beta^\alpha(x, y) = \begin{cases} 0 & \text{if } D_0^\alpha(x, y) = \text{missing} \\ 1 & \text{if } D_1^\alpha(x, y) = \text{missing} \\ 1 & \text{if } D_0^\alpha(x, y) > D_1^\alpha(x, y) \\ 0 & \text{otherwise} \end{cases}$$

Equation (3) corresponds to the following operation: when there is only one candidate pixel (either from left or right view) for a certain location, that pixel is used. If there are multiple candidates for a certain location from both views, the candidate that is closer to the camera is used initially. However, locations having two candidate pixels are remembered (in memory, e.g., with a flag or other standard technique).

The example preferred method in Eq (3) is a simple and efficient method for warped disparity maps and images, but other techniques can be used. For example β can actually take a value 0<β<1 as a function of the D's. More advanced blending functions with a dependency on the disparity values are used in other known methods and can also be used in the present invention.

A refinement step accounts for ghost images. The following refinement operation is conducted for those locations having the two candidate pixels to decide on the final value of the blended image:

$$I_\alpha(x, y) = I_1^\alpha(x, y) \text{ where}$$

$$l = \arg\min_{k \in \{0,1\}} \sum_{m=-1}^{1} \sum_{\substack{n=-1 \\ n \neq m = 0}}^{1} |I_\alpha(x-m, y-n) - I_k^\alpha(x, y)|$$

This operation accounts for the likelihood of a pixel's value with respect to its 8-point neighborhood, and chooses the one that is more likely among the two candidates. This refinement step can be executed multiple times to remove all the ghost images.

Unreliable disparities along object boundaries also cause problems around hole boundaries. This causes problems during hole-filling if not addressed beforehand. A morphological dilation operation can be applied to the holes to remove these pixels.

30—Coordinate Alignment and Pixel Extraction FIG. 1A

Coordinate alignment is conducted in the FIG. 1A embodiment. 3 virtual views are used as an example to synthesize at positions $\alpha=(\frac{1}{4}, \frac{1}{2}, \frac{3}{4})$. As noted above, however, the present method is not limited to any particular number of views to be synthesized. The placement matrices described above is used to synthesize three initial virtual views $I^{0.25}$, $I^{0.5}$, and $I^{0.75}$ for the camera positions $\alpha$. Since the virtual camera positions are selected along the baseline of the two reference cameras, each virtual camera is in stereoscopic configuration with respects to all of the other cameras.

In this configuration, testing indicated that each occluded region in a virtual view has corresponding occluded regions in all of the other virtual views, but they appear shifted horizontally. To enforce inter-view consistency of a synthesized region across all of the virtual views, the coordinate alignment and pixel extraction 30 finds, aligns, and fills corresponding occluded regions together. The alignment of occluded regions is determined by where these occluded regions exist in the reference images and the placement matrices keep track of these coordinates.

Disparity maps are typically unreliable at the object boundaries and may cause a ghost image to appear after this blending operation. After the alignment step, placement matrices extract neighboring local background layer in the reference images to fill in the occluded region in the virtual views. The local background layer of an occluded region is defined as the pixels in the reference images with the smallest disparity in a local neighborhood of the occluded region. In the 3D world, these pixels are the surface of an object that is the furthest away from view point of reference cameras in the local area of the occluded region.

Figure 5:
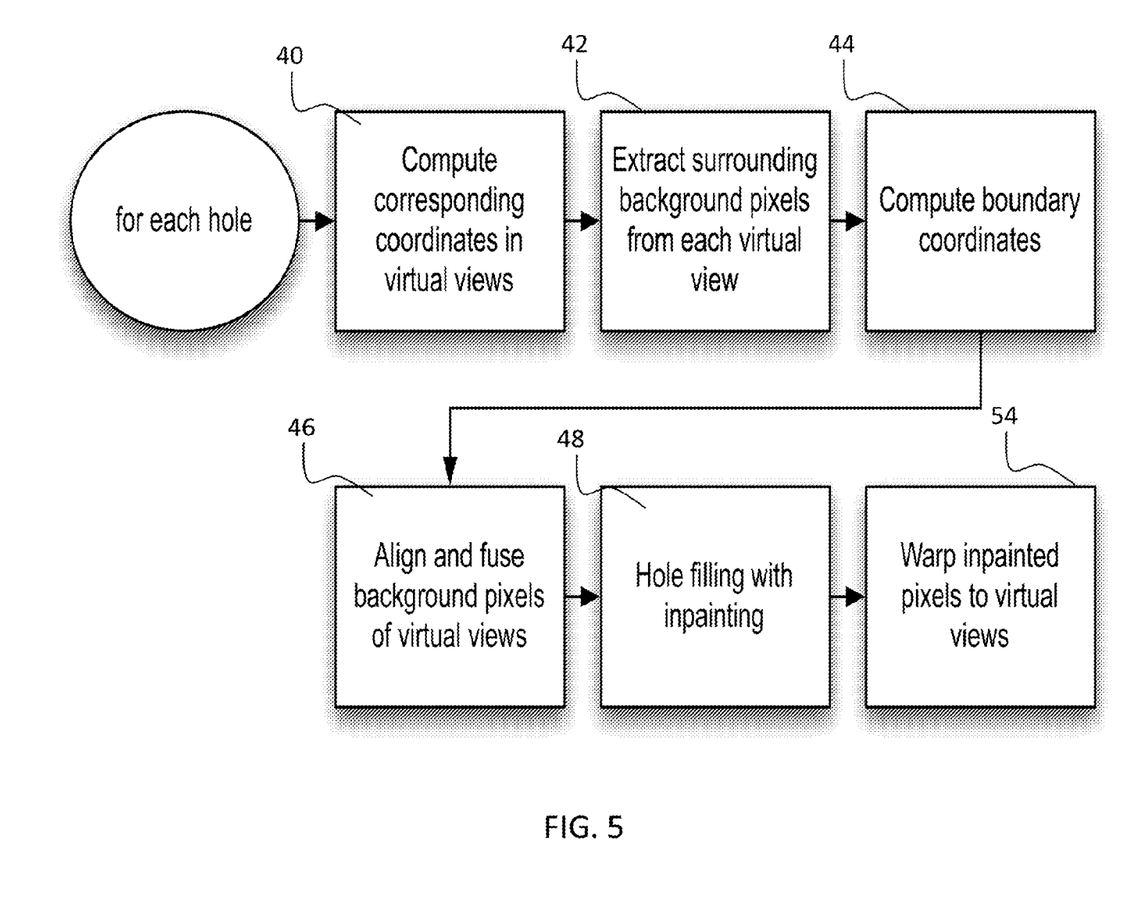
FIG. 5 is a block diagram of an inter-view consistency hole filling method.

FIG. 5 Common Background layer Hole Filling

FIG. 5 is a block diagram of an inter-view consistency hole filling method. To enforce inter-view consistency of corresponding occluded regions across all views, each virtual view is assigned to a vertical segment. In a virtual view, when an occluded region appears in segment $\gamma$, virtual view $\gamma$ is selected as the destination view. Then all the corresponding occluded regions in each virtual view are aligned to this destination view. The corresponding locations of their boundary pixels in the reference images are used as a measure of comparison to align the boundary pixels together.

The alignment matrix is used in the FIG. 1A embodiment to indicate whether a pixel at location (x,y) in virtual view $\alpha$ is aligned to a pixel in virtual view $\gamma$. For boundary pixels, it is computed as $$A^{\alpha,\gamma}(x, y) = \begin{cases} v^* & \text{if } \Phi(x, y) = 0 \\ 0 & \text{otherwise} \end{cases} \quad (5)$$

such that $$\Phi(x, y) = |\beta^\alpha(x, y) - \beta^\gamma(x, v^*)| + |P^\alpha(x, y) - P^\gamma(x, v^*)|, \quad (6)$$

Where $$v^* = \operatorname*{argmin}_{v}(|\beta^\alpha(x, y) - \beta^\gamma(x, v)| + |P^\alpha(x, y) - P^\gamma(x, v)|), \quad (7)$$

P and $\beta$ are defined in equations (2) and (3) respectively. In other words, two pixels can only be aligned if they were warped from the same reference image as well as the same pixel location. The variable encompasses all pixels in the non-occluded regions, but the result is explicit alignment of boundary pixels. This is part of the alignment of virtual views in FIG. 5 in the operation 46.

Coordinate values of the holes are first computed 40 for the virtual views. Aligning every non-occluded pixel is computationally intensive. Thus, to align the non-occluded pixel at location (x,y'), the boundary pixel at location (x,y') is used, which is the closest boundary pixel within the same row. Mathematically this operation corresponds to updating the alignment matrix as $A^{\alpha,\gamma}(x,y')=A^{\alpha,\gamma}(x,y')+(y'-y)$ involving the computation in 44 and alignment in 46.

Local Background Layer Extraction 42 FIG. 1A and FIG. 5

Surrounding background pixels are extracted from the local background for each or a number of virtual views 42 after all of the boundary coordinates have been examined. The extraction depends on the number of virtual views that are desired. Typically, for each of the virtual views, the same hole appears only slightly differently in each of the views. Thus, if there are 100 virtual views, extracting background pixels for only a few of them should still yield enough information. The coordinate alignment step 30 provides information that it is reutilized when filled-in pixels in the local background layer are being copied over to the foreground views. The most common method for stereo-to-multiview conversion is to first warp the pixels to the virtual view and perform hole filling after all the pixels are warped. The present inventors have recognized a limitation in such a technique because that method discards useful information from the reference images to aid the hole filling process. To recover all available information, the present method extracts local background pixels 42 directly from the reference images that neighbor the occluded regions in the virtual views. The invention recognizes that neighboring local background pixels might be obstructed in the virtual views while they are visible in the reference views.

A reference indicator map R is used to track the reference image that was used to warp pixels to the virtual view. The background pixel extraction process 42 for view a starts on the boundary pixels of an occluded region and extracts the local pixels from the reference views as follows:

$$E^\alpha(x, y) = \begin{cases} I_k(x, P_k^\alpha(x, y)) & \text{if } R^\alpha(x, y) = k \\ 0 & \text{if } R^\alpha(x, y) = \text{no reference} \end{cases} \quad (8)$$

This process continues on the neighboring non-occluded pixels until the disparity levels between neighboring pixels disagree by more than 3, chosen arbitrarily, to yield the best visual results. This was shown to work well for example datasets, but should be variable depending on the scene statistics. The disparities of the background pixels are extracted in a similar fashion and are stored in $F^\alpha$ to complete computation of boundary coordinates in the operation 42

46—Fusion of Extracted Background Pixels and Alignment Matrices

After the alignment and pixel extraction processes are completed, each extracted region in view α is aligned and fused together to the destination view γ. This process is initiated as B=E$^\gamma$ and C=F$^\gamma$ and then updated with each of the virtual views. For virtual view α, B and C is updated as follows:

$$B(x, y) = \begin{cases} E^\gamma(x, A^{\alpha,\gamma}(x, y)) & \text{if } B(x, y) = 0 \\ E^\gamma(x, A^{\alpha,\gamma}(x, y)) & \text{if } B(x, y) \neq 0 \text{ and } C(x, y) > C^\alpha(x, y) \\ \text{do nothing} & \text{otherwise} \end{cases} \quad (10)$$

and $$C(x, y) = \begin{cases} F^\gamma(x, A^{\alpha,\gamma}(x, y)) & \text{if } C(x, y) = 0 \\ F^\gamma(x, A^{\alpha,\gamma}(x, y)) & \text{if } C(x, y) \neq 0 \text{ and } C(x, y) > C^\alpha(x, y) \\ \text{do nothing} & \text{otherwise} \end{cases} \quad (11)$$

The present method, compared to conventional DIBR, not only provides more information but also removes irrelevant objects to simplify the hole filling process of the occluded regions. With the alignment step, each occluded region is required to be synthesized only one time, and it is independent of how many intermediate views one wishes to synthesize. The present method also provides inter-view consistency across all intermediate views.

Hole Filling 48 FIG. 2 & FIG. 1A

Hole filling is similar in both of the FIG. 1A and FIG. 2 embodiments. Thus, it is discussed together with respect to the FIG. 5 hole filling 48, which is then conducted in the local (FIG. 1A) or common (FIG. 2) background layer. The FIG. 2 hole filling is a simplification of the coordinate alignment approach that is used in FIG. 1A. As the first step to a hole filling solution, a background layer is generated by mapping holes 45 on a common background layer (FIG. 2) and then combining the pixels belonging to common background regions onto a single layer 47 (FIG. 2). Holes of the foreground views occur when there is no information coming from either of the captured views, corresponding to the disocclusion regions. For this reason, holes need to get filled by the information from the (local or common) background (FIGS. 1A & FIG. 2). Additionally, if more than one view is to be synthesized, the same disocclusion region will appear as a hole in each of those views. Generating a common background layer (only in FIG. 2) is an efficient way to account for this and then fill in the holes directly on this common background layer, which is also useful for reducing the complexity of the view synthesis process as the hole filling procedure needs to be executed once on the common background layer, independent of the number of views to be synthesized. The common background layer can be simply created by repeating the foreground views, excepting pixels that are further away from the camera (smaller disparity) are warped over the others 50.

After the common background layer has been generated, disocclusion regions are located on the common background layer. A disparity level for each of the holes in each synthesized foreground view is determined. This provides information about where these holes would be positioned on the common background layer. With these positions, these holes can be mapped onto the common background layer. After this step, the corresponding holes get overlaid on each other, which enables treating them as one hole in the hole filling stage 48. For deciding on the disparities of the holes, a check is conducted along the disparities on the boundary of the hole and the minimum disparity encountered is selected. This choice corresponds to assigning the holes to the farthest neighboring regions. However, it is also possible to pose this decision as an optimization problem (i.e. Maximum Likelihood) given the neighboring disparity values to the holes.

Hole filling 48 is very similar for FIG. 1A and FIG. 2. The only difference is that in FIG. 1A, the known pixels used for patch-matching are only the local background pixels extracted for a specific hole, whereas for the FIG. 2 it is the whole common background layer.

Holes are filled in directly 48 on the (common or local) background image after the holes are located on the disocclusion regions on the (common or local) background layer. Background information can then be used to fill in the missing regions with any inpainting/texture synthesis method. After the (common or local) background layer is generated and the disocclusion regions are filled, it is ready to be used as a reference image for filling in the holes of the foreground views. Once the holes are filled on the (common or local) background layer, then the generated information is simply mapped back onto the foreground views 54 (FIGS. 1A, 2 and 5). Operation 54 and addition operation 56 jointly depict the texture mapping back onto foreground views, when pixels are combined from both foreground views and filled-in (common or local) background layer to get the final outcome to produce a synthesized view 14.

In preferred methods, hole-filling 48 is conducted with patch matching and examplar based inpainting. This technique fills in the target region (Ω), from a source region (Φ) given in the image, by copying over a patch from the source region. The patches are copied onto the target region one by one, and centered on a pixel on the contour of the fill region, or the so-called "fill front" (δΩ) in each iteration of the algorithm.

In a preferred synthesis method, a modified version of the exemplar based inpainting is used. First of all, to decide on which patch to fill in next, a simplified filling priority can be used. The filling priority for a patch centered at (x,y) is calculated as $$FP(x, y) = \frac{|G_=(x, y)| + |G_{||}(x, y)|}{|G_=(x, y)G_{||}(x, y)| + \varepsilon}, \quad (12)$$

where $G_=$ and $G_{||}$ are the horizontal and vertical gradients of the image and ε is a positive constant that is not zero. Then, compute edge map H with Canny edge detector and update the filling priority to $$FP(x,y)=FR(x,y)+H(x,y)\max(FP). \quad (13)$$

To generate the candidate patches, first partition the background layer into patches of 5×5. Then for each successful patch candidate encountered (all pixel values of the patch is known), three additional candidates are introduced by rotating the patch 90, 180, 270 degrees. Other angles could also be used but the patch size needed would vary with the angle selected and require additional computation. The inpainting algorithm is modified such that, for a patch that is centered on a detected edge, only the patch candidates along that edge are considered.

Hole filling with foreground image is not optimal since the holes are most likely to be filled in from the background regions. Preferred methods of the invention also synthesize a background layer that combines the pixels belonging to background regions onto a single layer. This is similar to coordinate alignment idea but is simplified to utilize CUDA parallel programming. In order to achieve that, the pixel warping steps described for foreground views are repeated, except now pixels that are further away from the camera (smaller disparity) are warped over the others. For such occasions where there exist two pixels with column indices $y_m$ and $y_n$ and row index x such that $y_m \neq y_n$ and $y'=y_m-\alpha D_k(x,y_m)=y_n-\alpha D_k(x, y_n)$, a placement matrix for background pixel warping is calculated with the following rules:

$$P_k^\alpha(x, y') = \begin{cases} y_n & \text{if } D_k(x, y_m) > D_k(x, y_n) \\ y_m & \text{otherwise} \end{cases} \quad (14)$$

Thus, for common background layer generation, pixel warping requires equation (2) to be changed to equation (14) while equation (3) remains the same.

Preferred embodiments use a simpler approach to locate where holes are position onto the common background layer. Once a disparity level for each of the holes in each synthesized foreground view is determined, information is available about where these holes would be positioned on the common background layer. With these positions, map all these holes onto the common background layer. After this step, the corresponding holes get overlaid on each other, which permits treating them as one in the hole filling stage. For deciding on the disparities of the holes, a simple check for the disparities on the boundary of the holes can be conducted and the minimum disparity selected. Since it is likely that a hole is occurring due to an occlusion, this choice of disparity forces the holes to be filled from the neighboring background texture.

In a preferred embodiment, holes are filled directly on the (common or local) background layer. This helps to use as much of the (common or local) background information as possible available to us for filling in the missing regions. A preferred implementation, modifies a known algorithm. 18. A. Criminisi, P. Perez, K. Toyama "Region Filling and Object Removal by Exemplar-Based Image Inpainting," IEEE Transactions on Image Processing, 13(9):1200-1212 (2004). However, the present method does not use $\Phi=I-\Omega$ (I signifies the whole image) to incorporate the depth information within the inpainting process. Instead, calculate $\Psi$ separately as follows: Let $D_{BG}$ be the disparity map of the background layer and $D_\Omega$ be the minimum disparity along the boundary of the hole. Then, choose $\Psi=|D_{BG}-D_\Omega|<\tau$, where $\tau$ is a constant (e.g., 3 in the experiments).

After the holes of the common background layer are filled, only a subset of the discussed steps required for an initial synthesized view are needed to synthesize an additional view. The already available common background layer can be reused directly for each new view, which also ensures that the new views are consistent with the previously generated views. Thus for generating an additional view, generating the new foreground view with holes 16, deciding on a disparity value for each hole and mapping the texture pixels from the corresponding position on the background layer are sufficient in the texture mapping 54 of FIG. 2.

Experimental Data

An algorithm to execute FIG. 2 has been implemented in the CUDA GPU programming language to provide a working prototype. The prototype allows the user to interactively generate multiple views, change the positions of the synthesized views and control the baseline between them, and simultaneously see them in 3D using an autostereoscopic display.

The method was tested on the Middlebury dataset, and the objective quality of the synthesized view at position $\alpha=0.5$ is measured using PSNR and SSIM, and reported in Table 1.

TABLE 1

| Objective quality assessment of the method | | | | | | | | | | | |
|---|---|---|---|---|---|---|---|---|---|---|---|
| Image Name | Art | Books | Cloth1 | Dolls | Laundry | Moebius | Monopoly | Plastic | Reindeer | Wood1 | Avg |
| PSNR [dB] | 32.09 | 30.15 | 35.68 | 31.95 | 31.63 | 33.92 | 32.65 | 38.09 | 33.40 | 37.36 | 33.69 |
| SSIM | 0.94 | 0.92 | 0.97 | 0.94 | 0.95 | 0.95 | 0.95 | 0.98 | 0.94 | 0.94 | 0.95 |

The prototype was run on a NVIDIA 580GTX graphics card with 512 CUDA cores and 1536 MB memory. For the standard dataset images in Table 1, the total execution times for generating an initial synthesized view varied between about (precisely 0.39s) 1 to (11.33s) 11 seconds for Cloth 1 and Monopoly, respectively. This time is for generating 3 virtual views. and as the number of virtual views the increase in computation time is sub-linear. Additional views are generated with lesser computational expense. The testing showed that is possible to generate many views at a time very efficiently and reliably from a rectified stereo pair of images or videos (assuming their disparity information is known or estimated).

Autostereoscopic displays are expected to become the main consumer level display for providing a glasses-free 3D experience to the user. Generating content however is always challenging for these displays and will require smart approaches rather than simply capturing the scene with many cameras simultaneously. The present method is well-suited to meet this challenge because the generated content provides consistency between the generated views, and the increase in required execution time with each additional view is very low (on the order of milliseconds). This is useful both for generating 3D advertisements and converting stereo 3D movies into a format that is compatible with autostereoscopic displays.

Even for stereo 3D, every display has different specifications (size, optimal watching distance, pixel density etc.) and can display different amounts of depth (i.e. mobile platforms vs. movie theaters). Therefore, the 3D content needs to be adjusted according to the display, which is currently handled at the content generation stage. An alternative could be to have a slider on the display which allows the user to control the amount of depth shown. The present invention can operate as a post processing step at the user side and achieve this by changing the baseline between virtual views.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A method for rendering multiple view data from a stereoscopic video data stream, comprising:
   receiving or estimating a disparity map D from the stereoscopic data;
   forming a placement matrix P to warp known pixels onto an image plane of a desired view, the placement matrix at position α in the placement matrix is defined as:

$P_k^\alpha(x, y+(k-\alpha)D_k(x,y)) = y,$ where x and y are row and column indices, respectively, k is a reference image position indicating a view from the multiple view data, and the placement matrix $P_k(x, y) = \hat{y}$ provides a pixel location $(x', \hat{y})$ in the reference image that should be mapped on the pixel location $(x', y')$ in a virtual view after warping; and
   with the placement matrix, using a look-up table to conduct image warping.

2. The method of claim 1, further comprising resolving any mapping of multiple pixels from different disparity levels onto the same pixel location by favoring pixels with larger disparity when generating foreground and for other occasions where there exist two pixels with column indices $y_m$ and $y_n$, and row index x such that $y_m \neq y_n$ and $y' = y_m - \alpha D_k(x, y_m) = y_n - \alpha D_k(x, y_n)$, using the following rule:

$$P_k^\alpha(x, y') = \begin{cases} y_m & \text{if } D_k(x, y_m) > D_k(x, y_n) \\ y_n & \text{otherwise} \end{cases}. \quad (2)$$

3. The method of claim 2, further comprising a refining step to choose final pixel values based upon the neighborhood of a pixel to choose a more likely value amount two or more candidate values.

4. The method of claim 1, further comprising:
   conducting coordinate alignment between multiple views; and
   repairing holes in said multiple views individually with respect to a local background layer; and
   generating final views using repaired information from the multiple views.

5. The method of claim 1, further comprising:
   generating a common background layer for multiple views;
   repairing holes in the multiple views on the common background layer; and
   generating final views using repaired information from the common background layer.

* * * * *